(12) United States Patent
Georgiades

(10) Patent No.: US 12,199,655 B2
(45) Date of Patent: Jan. 14, 2025

(54) DEVICE FOR CHARGING AND MOUNTING ELECTRONIC DEVICES

(71) Applicant: Molonlave Group LLC, Long Island City, NY (US)

(72) Inventor: Marios Georgiades, Saddle River, NJ (US)

(73) Assignee: Molonlave Group LLC, Long Island City, NY (US)

( * ) Notice: Subject to any disclaimer, the term of this patent is extended or adjusted under 35 U.S.C. 154(b) by 0 days.

(21) Appl. No.: 17/525,346

(22) Filed: Nov. 12, 2021

(65) Prior Publication Data

US 2022/0149881 A1 May 12, 2022

Related U.S. Application Data

(60) Provisional application No. 63/112,997, filed on Nov. 12, 2020.

(51) Int. Cl.
*H04B 1/3883* (2015.01)
*G06F 13/42* (2006.01)
*H04B 1/3888* (2015.01)
*H04M 1/04* (2006.01)

(52) U.S. Cl.
CPC ....... *H04B 1/3883* (2013.01); *G06F 13/4282* (2013.01); *H04B 1/3888* (2013.01); *H04M 1/04* (2013.01); *G06F 2213/0042* (2013.01)

(58) Field of Classification Search
CPC .................................................. H04B 1/3883
See application file for complete search history.

(56) References Cited

U.S. PATENT DOCUMENTS

| D814,412 S | 4/2018 | Georgiades | |
|---|---|---|---|
| D816,026 S | 4/2018 | Georgiades | |
| D816,606 S | 5/2018 | Georgiades | |
| 10,097,913 B2 | 10/2018 | Zörkendörfer et al. | |
| 10,182,282 B2 | 1/2019 | McPeak et al. | |
| 2010/0317412 A1* | 12/2010 | Tan | H02J 7/0044 455/573 |
| 2015/0334220 A1* | 11/2015 | Shannon | H04M 1/72409 455/575.1 |
| 2019/0081426 A1* | 3/2019 | Chavakula | H01R 13/40 |

OTHER PUBLICATIONS

Rushcharge, "Products—Rush Charge," https://rushcharge.com/collections/all, retrieved Sep. 17, 2018, 4 pages.
Rushcharge, "Rush Charge—The Best Portable Battery Bank," https://rushcharge.com, 2021, 8 pages.

(Continued)

*Primary Examiner* — Hsinchun Liao
(74) *Attorney, Agent, or Firm* — Ryan, Mason & Lewis, LLP

(57) ABSTRACT

An electronic device includes a base portion, a male connector on the base portion, a body portion connected to the base portion by a hinge portion, and a battery electrically connected to the male connector. The body portion rotates with respect to the base portion via the hinge portion. The male connector connects to a second electronic device disposed on the base portion.

20 Claims, 11 Drawing Sheets

(56) References Cited

OTHER PUBLICATIONS

Rushcharge, "Rush Charge Plus—Most Convenient Portable Charger for Any Device," https://rushcharge.com/products/rush-bank, retrieved Nov. 12, 2020, 5 pages.
Design U.S. Appl. No. 29/728,519 filed in the name of Marios Georgiades filed Mar. 19, 2020 and entitled "Electronic Device."
U.S. Appl. No. 17/208,589 filed in the name of Marios Georgiades filed Mar. 22, 2021 and entitled "Device for Charging Electronic Devices and In-Ear Headphones."
Design U.S. Appl. No. 29/758,175 filed in the name of Marios Georgiades filed Nov. 12, 2020 and entitled "Electronic Device."
U.S. Appl. No. 17/374,677 filed in the name of Marios Georgiades filed Jul. 13, 2021 and entitled "Portable Charger with Interchangeable Connectors."

\* cited by examiner

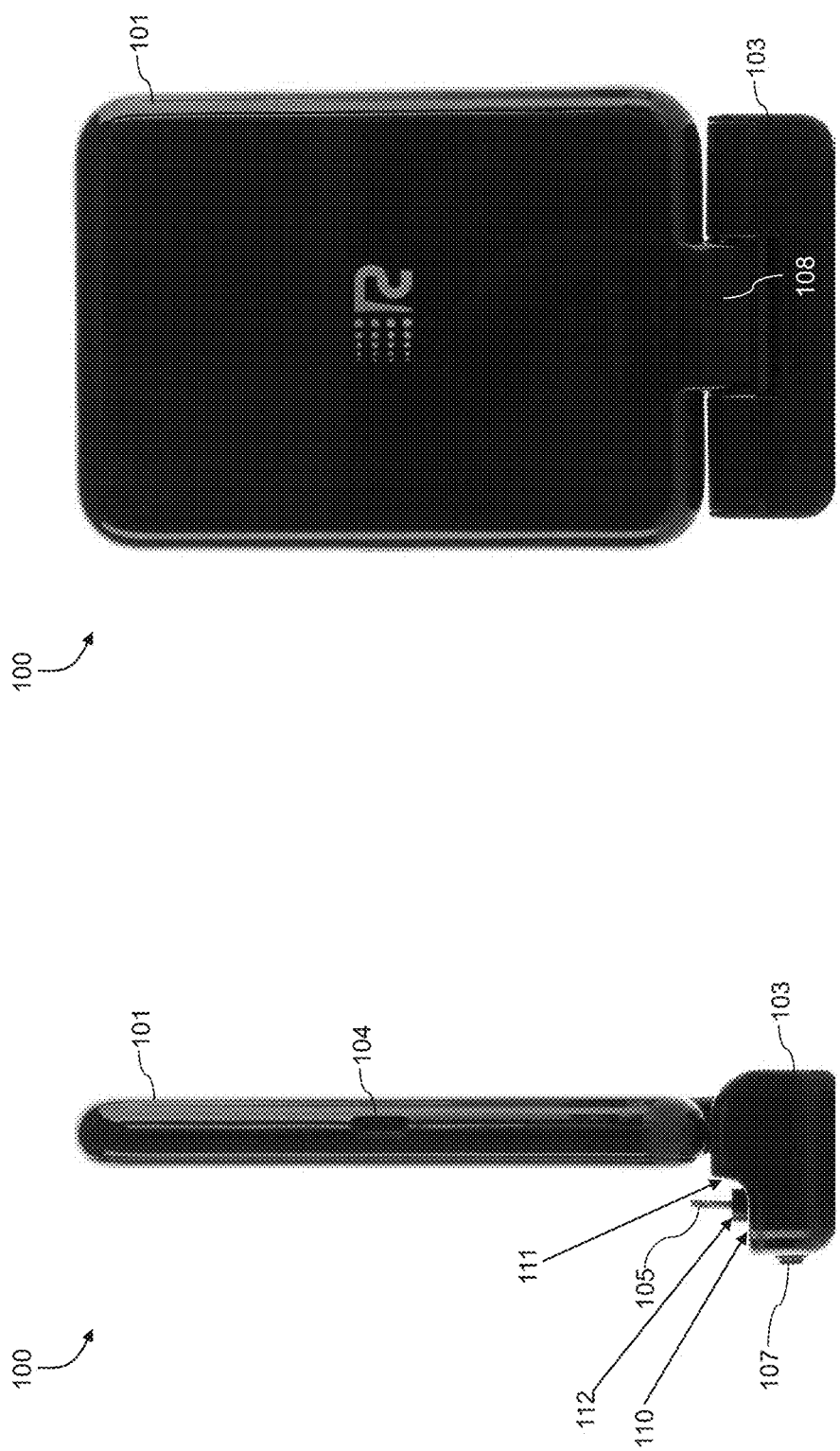

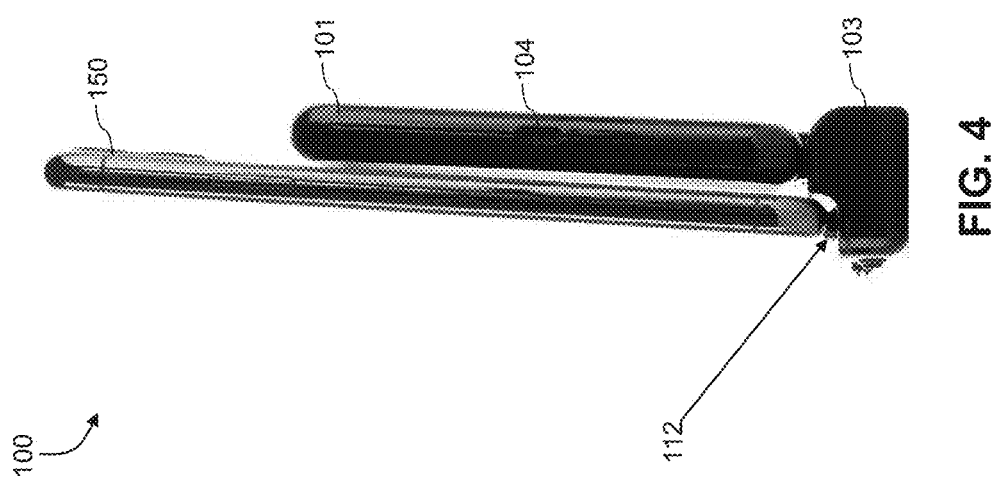

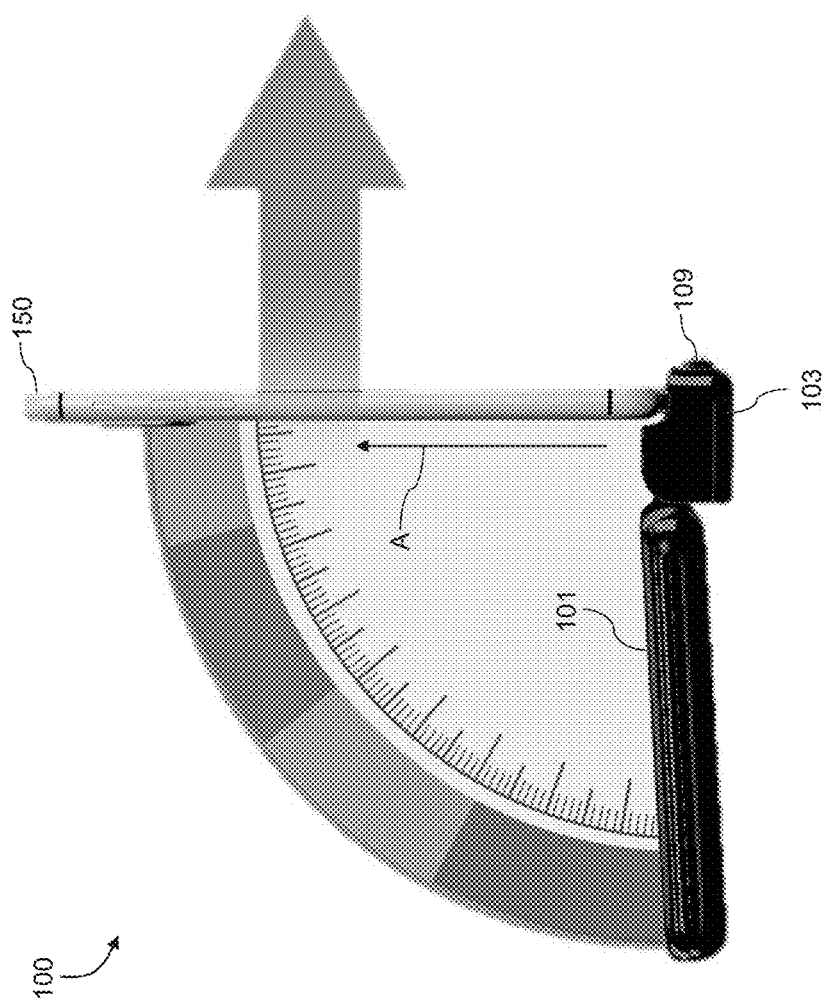

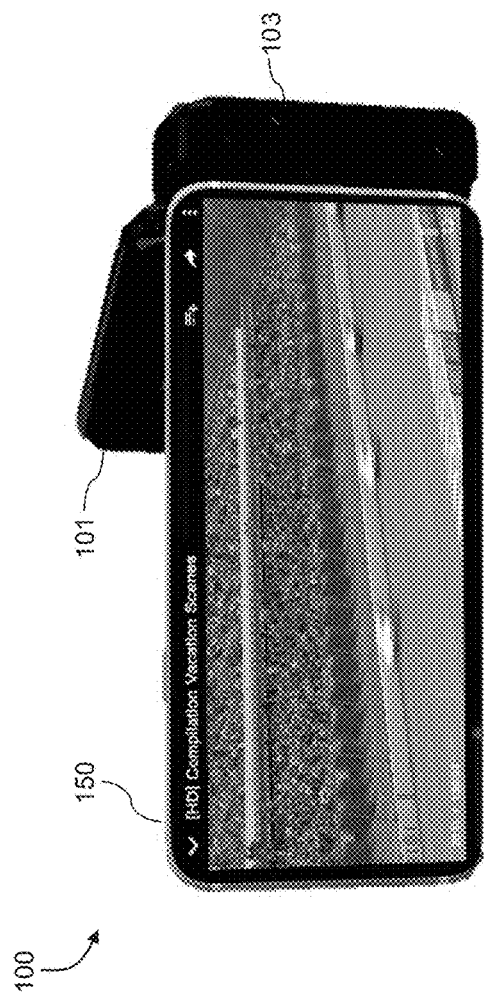
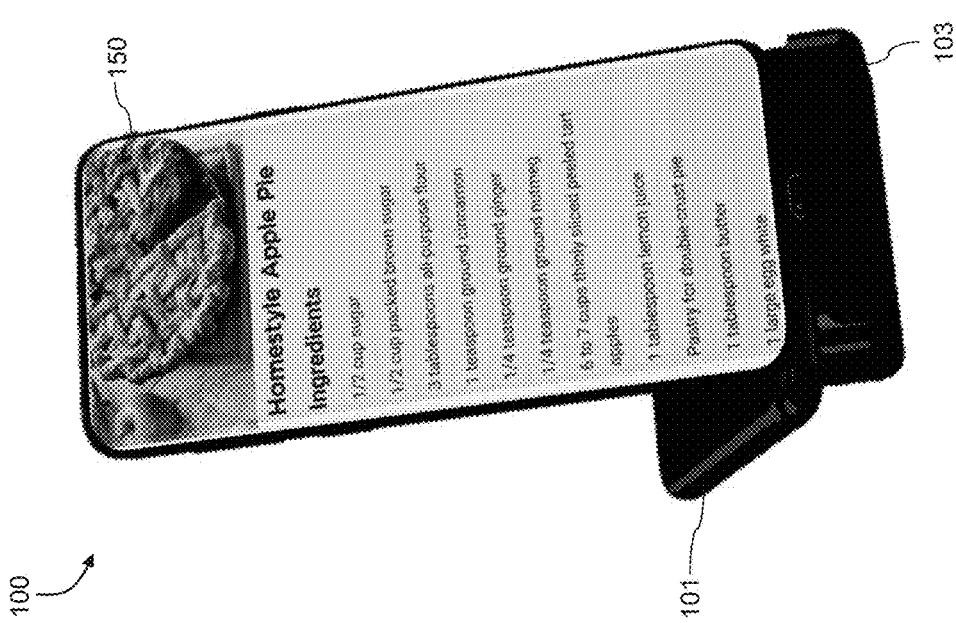
FIG. 11B
FIG. 11A

DEVICE FOR CHARGING AND MOUNTING ELECTRONIC DEVICES

FIELD

The field relates generally to a device used to charge and mount electronic devices, such as, for example, portable electronic devices, including but not necessarily limited to, mobile phones, smartphones, and tablets.

BACKGROUND

Portable personal electronic devices have become ubiquitous, and are used by many individuals on a daily basis. Such personal electronic devices may include mobile phones, smartphones, and tablet computers. It is estimated that 5 billion people worldwide have mobile devices. Individuals use such devices to access a variety of mobile applications such as, social media applications, online video and audio streaming applications, and mobile gaming applications. For example, individuals often user their devices to watch video programs, and to read written materials such as, for example, articles, reference materials and news reports.

Portable personal electronic devices typically come equipped with rechargeable battery technology such that a user need not replace their batteries when they become discharged. Such battery technology can be recharged using battery chargers, such as, for example, wall outlet chargers and portable charging devices. However, such portable charging devices are typically cumbersome and when in use limit a user's ability to use their device for other tasks.

Therefore, a need exists for implementing a non-cumbersome recharging device that maintains the portability and usability of personal electronic devices.

SUMMARY

Illustrative embodiments of the invention provide a portability device configured to perform portable recharging and mounting of an electronic device.

According to an embodiment, an electronic device includes a base portion, a male connector on the base portion, a body portion connected to the base portion by a hinge portion, and a battery electrically connected to the male connector. The body portion rotates with respect to the base portion via the hinge portion. The male connector connects to a second electronic device disposed on the base portion.

BRIEF DESCRIPTION OF THE DRAWINGS

FIG. 1 shows a front view of a charging and mounting device in accordance with an embodiment.

FIG. 2 shows a left side view of the charging and mounting device in accordance with an embodiment.

FIG. 3 shows a rear view of the charging and mounting device in accordance with an embodiment.

FIGS. 4 and 5 show left side views of the charging and mounting device including a portable personal electronic device mounted thereto in accordance with an embodiment.

FIGS. 8, 9 and 10 show right side views of the charging and mounting device including a portable personal electronic device mounted thereto and in different open configurations in accordance with an embodiment.

FIG. 11A shows a portable personal electronic device in a vertical viewing position when mounted to the charging and mounting device in accordance with an embodiment.

FIG. 11B shows a portable personal electronic device in a horizontal viewing position when mounted to the charging and mounting device in accordance with an embodiment.

DETAILED DESCRIPTION

Figure 5:
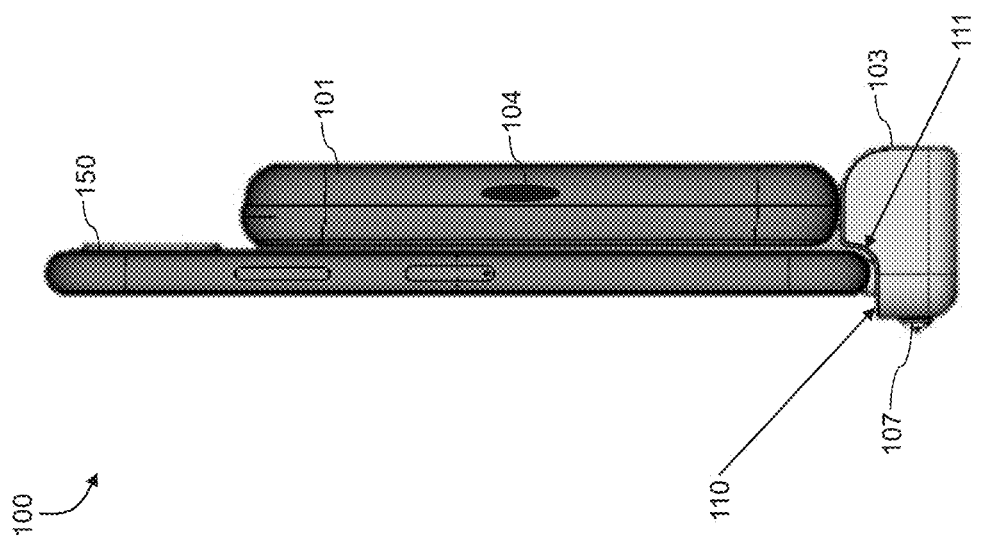
Figure 6:
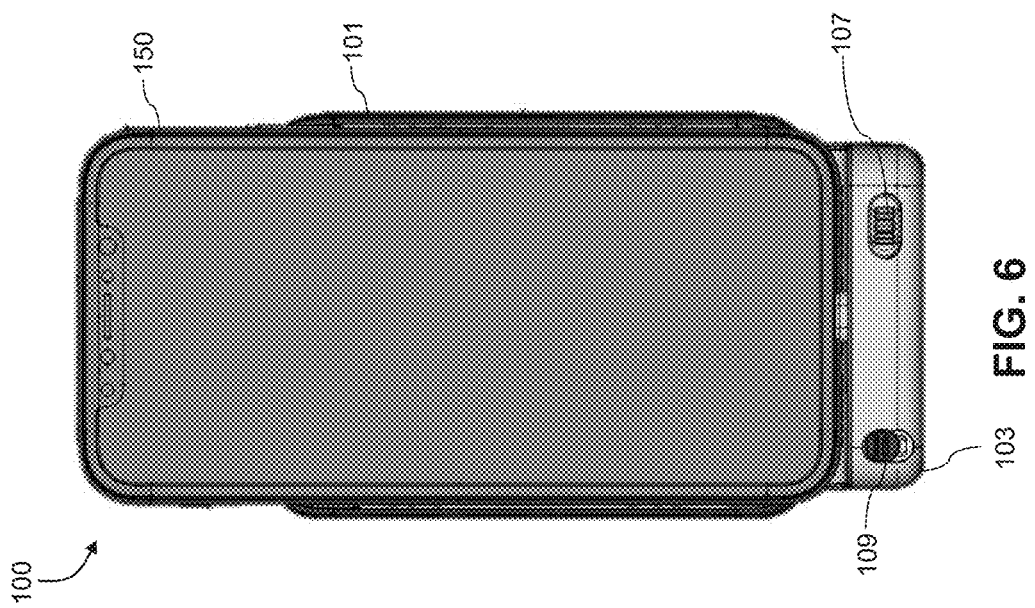
FIG. 6 shows a front view of the charging and mounting device including a portable personal electronic device mounted thereto in accordance with an embodiment.

A need exists for a non-cumbersome, portable charging device that can recharge portable personal electronic devices, while maintaining a hands-free user experience. As detailed herein, one or more embodiments provide a device that can perform recharging of a personal electronic device and mounting of the personal electronic device so that a user can charge and view the personal electronic device in multiple positions without holding the personal electronic device.

FIGS. 1-3 illustrate a device 100, which comprises an upper body portion 101 and a base portion 103. A male connector 105 extends from the base portion 103 and is integrated with the base portion 103. The male connector 105 comprises, for example, a male micro-universal serial bus (USB) connector, a male USB-mini connector, a male USB-C connector, a male lightning (Apple®) connector or other type of portable device connector.

A rechargeable battery is disposed in the upper body portion 101, and is electrically connected to the male connector 105. The male connector 105 is configured for being inserted into a female connector of a second electronic device, including but not necessarily limited to, a mobile phone, smartphone or a tablet. The second electronic device is pictured in FIGS. 4-11B as a smart phone 150, but is not necessarily limited thereto. For example, the second electronic device can be a tablet, miniature tablet or other portable device. When connected to the device 100 via the male connector 105, the battery in the upper body portion 101 can charge a battery of the second electronic device. Alternatively, the battery can be disposed in the base portion 103.

As can be seen in, for example, FIGS. 2 and 5, the base portion 103 is formed in stepped configuration having a landing portion 110 and a riser portion 111, such that the second electronic device (e.g., smartphone 150) can rest on the landing and riser portions 110 and 111 for support when mounted to the device 100. Additional support can be provided via the connector 105, which is mounted on a pedestal portion 112 to reinforce the physical connection of the connector 105 to the base portion 103.

In one or more embodiments, the connector 105 and the pedestal portion 112 are recessed in an opening in the base portion 103 and protrude from the base portion 103 when a button 107 on the base portion 103 is activated (e.g., slid in the left or right direction) to cause a spring loaded mechanism to have the base portion and pedestal spring out through the hole to a resting position shown in FIGS. 1 and 2. When not charging a second electronic device, the connector 105 and pedestal portion 112 can be pushed back into the recessed position in the hole in the base portion 103, and released again at some future time by activating the spring loaded button 107.

Figure 12:
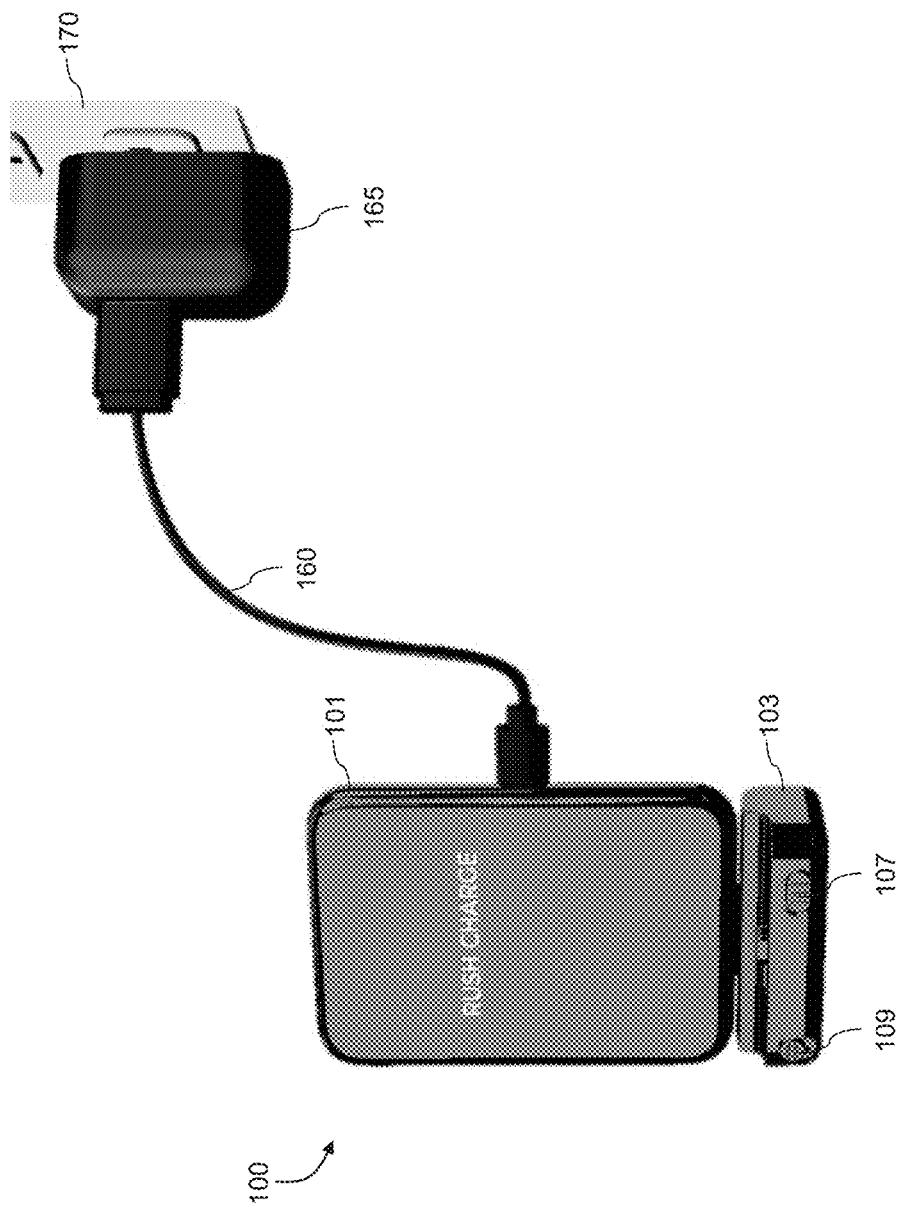
FIG. 12 depicts charging of the charging and mounting device in accordance with an embodiment.

The upper body portion 101 comprises a female connector 104 electrically connected to the battery in the upper body portion 101 via, for example, a printed circuit board assembly (PCBA) (not shown) and one or more wires (not shown). The female connector 104 is configured for receiving, for example, a male micro-USB connector, a male USB-mini connector, a male USB-C connector, a male lightning connector, or other type of connector that is connected to a power source, such as, for example, a standard household outlet providing 15 amperes (amps) of current and 120 volts. For example, referring to FIG. 12, the female connector 104 is connected to an outlet 170 via a power cord 160 having the male connector inserted into the female connector 104 at one end and connected at the other end to a plug 165 inserted into the outlet 170. The power cord 160 is connected to the plug 165 via, for example, a USB connector that is inserted into the plug 165, which is plugged into the outlet 170. The battery of the device 100 is able to be charged via the female connector 104 when connected to the power source.

Figure 7:
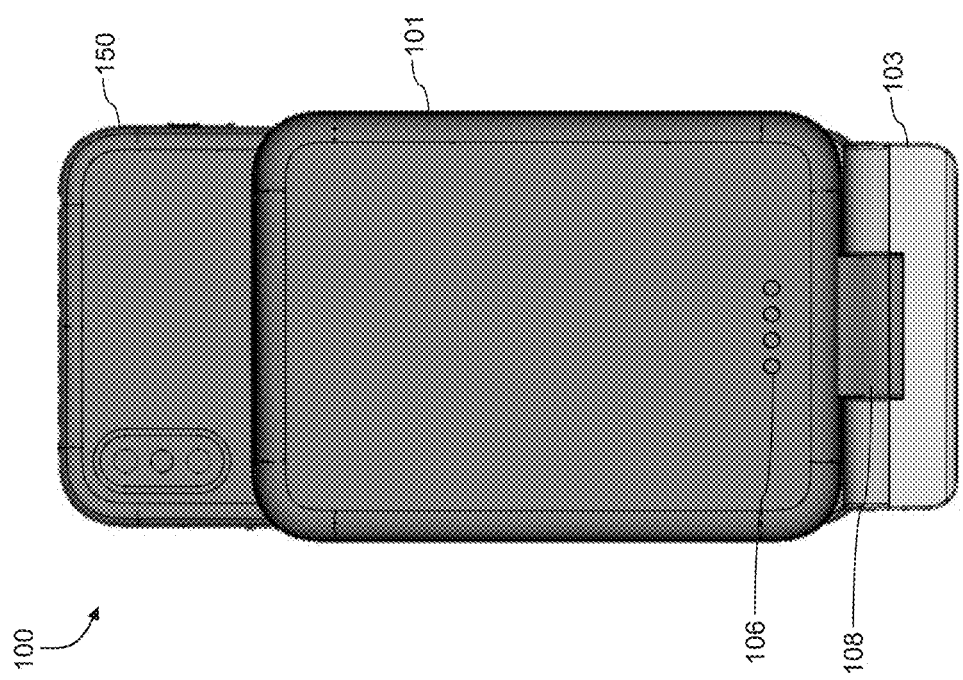
FIG. 7 shows a rear view of the charging and mounting device including a portable personal electronic device mounted thereto in accordance with an embodiment.
Figure 8:
Figure 9:
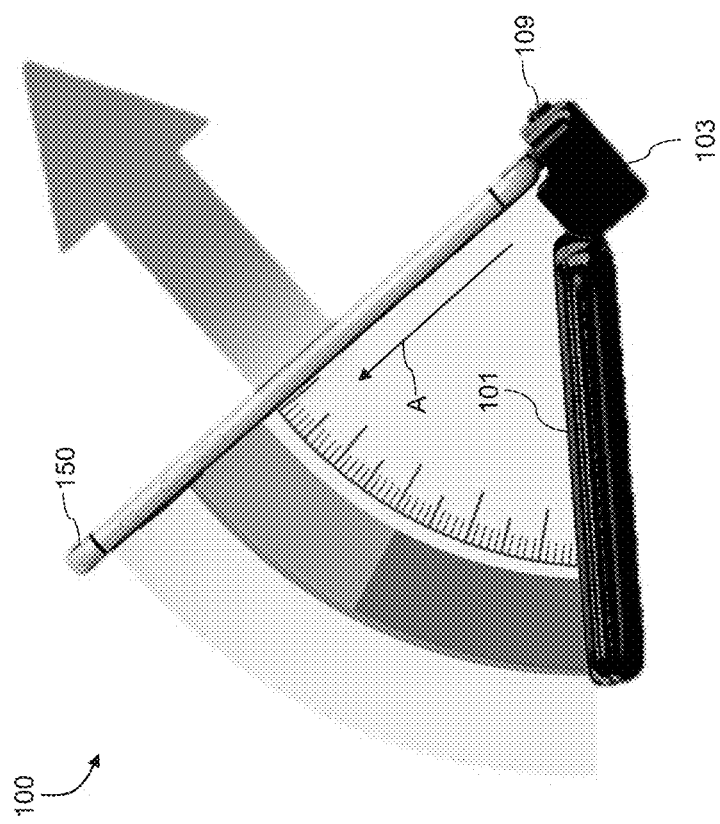

Referring to, for example, FIGS. 3, 7 and 8, the upper body portion 101 is connected to the base portion 103 by a hinge mechanism 108. As can be seen in FIGS. 8-10 and 11A-11B, the hinge mechanism 108 rotates with respect to the base portion 103 so that the upper body portion 101 can pivot from about 0 degrees to about 90 degrees with respect to the axis A extending perpendicular to a top surface of the base portion 103. As can be seen in FIG. 10, the angle of the upper body portion 101 with respect to the axis A may be greater than 90 degrees. As can be seen in FIGS. 6, 8-10 and 12, the base portion 103 includes a button 109, which can be used to lock the hinge mechanism 108, and consequently the upper body portion 101 coupled to the hinge mechanism 108, at a particular angle with respect to the axis A. For example, according to one or more embodiments, the hinge mechanism 108 can be locked at any angle in the range of motion of the hinge mechanism 108 by setting the button 109 to a first position (e.g., up or down). The hinge mechanism 108 can be unlocked by the setting the button to a second position opposite the first position to enable the hinge mechanism 108 and the connected upper body portion 101 to freely rotate. Once the hinge mechanism 108 and the connected upper body portion 101 reach a desired angle, the button 109 can be switched back to the first position to again lock the hinge mechanism 108 at a desired angle.

Referring to FIGS. 8-10 and 11A and 11B, the upper body portion 101 can be used as a support to stabilize the device 100 for viewing of the second electronic device (e.g., smartphone 150) at a variety of angles (e.g., between 0 and 90 degrees with respect to axis A), and in a variety of orientations. For example, as shown in FIGS. 11A and 11B, the device can be oriented so that the second electronic device (e.g., smartphone 150) is in a vertical viewing position (FIG. 11A) or a horizontal (FIG. 11B) viewing position, where the upper body portion is on a wider side (vertical position) or narrower side (horizontal position).

Referring to FIG. 7, the device 100 further includes a plurality of light emitting diodes (LEDs) 106 on the rear surface of the upper body portion 101. The LEDs 106 are electrically connected to the PCBA and are connected to circuitry in the PCBA to enable the LEDs 106 to indicate a charge status of the battery in the upper body portion 101. For example, the charge status of the battery can be indicated by a number of the LEDs 106 that are lit at a given time and/or by the color of the LEDs 106. The number of LEDs 106 that are lit is proportional to the amount of charge of the battery (e.g., less lit LEDs 106=less charge, and more lit LEDs 106=more charge). In addition or as an alternative to indicating charge status with the number of lit LEDs 106, a color of the LEDs 106 may indicate an amount of charge for the battery (e.g., green/blue—75-100% charged, yellow—25-50% charged, red—0-25% charged). Other indicators besides LEDs may be used.

In operation, when the second electronic device (e.g., smartphone 150, tablet or other rechargeable portable personal electronic device) is mounted on the base portion 103, the male connector 105 is connected to the second electronic device. In this case, the device 100 via the PCBA, is configured for having the battery charge the connected second electronic device.

In addition, as described above, a power source can be connected to the device via the female connector 104. The power source (e.g., from a wall outlet 170 or other charging device) can be connected to the device 100 while the second electronic device is connected to the device 100 via the male connector 105 and charging. The device is configured via the PCBA to have pass through technology, such that using the power source, the battery in the device 100 can be recharging while a connected second device is also being charged.

According to an embodiment, the PCBA includes load balancing circuitry and power regulating circuits to transfer power from the power source to the battery in the device 100 and to the connected second device. As can be understood, the device 100 is a portable charging device that can be used to charge other devices while not connected to (e.g., plugged into) a power source, or while connected to (plugged into) a power source.

In an embodiment, the portable recharging device maintains portability features such that, in a non-limiting example, the portable recharging device 100 is small enough to fit in one's pocket for storage.

Although one male connector 105 and one female connector 104 are shown, the embodiments are not necessarily limited thereto. The device 100 may include more than one male and/or female connectors for different types of connections. For example, the device 100 can include male and female connectors for both Android® and Apple® portable devices.

In accordance with one or more embodiments, the battery in the device 100 is configured to be recharged with suitable power requirements, such as, by non-limiting example, recharging with at least 5V and 1.3 A, which would recharge the battery in approximately 75 minutes. Such a capability allows the portable recharging device 100 to be reused multiple times, such as, for example, over 1,000 times.

According to one or more embodiments, the battery in the device 100 has a capacity to fully recharge the battery of a connected electronic device. By non-limiting example, the battery of the portable recharging device 100 can be 1800 mAh-3600 mAh. The battery is configured to recharge an electronic device with suitable power requirements, such as, by non-limiting example, with the portable recharging device 100 outputting at least 5V and 1.7 A.

Although exemplary embodiments of the present invention have been described hereinabove, it should be understood that the present invention is not limited to these embodiments, but may be modified by those skilled in the art without departing from the spirit and scope of the present invention.

What is claimed is:

1. An electronic device, comprising:
   a base portion, wherein the base portion comprises:
   a bottom surface, a back surface, a front surface, a top surface, and a stepped portion including a landing portion extending from the front surface, and a riser portion extending from the top surface; and a male charging connector on the landing portion and configured for connecting to a second electronic device disposed on the stepped portion;

a body portion connected to the base portion by a hinge portion;

wherein the hinge portion is disposed in part of the back surface and extends from the back surface to a surface of the body portion; and a battery electrically connected to the male charging connector;

wherein the body portion rotates in a range of angles with respect to the base portion and with respect to the second electronic device disposed on the stepped portion via the hinge portion;

wherein the body portion is rotatable to an angle in the range of angles at which the body portion is oriented over the top surface of the base portion; and wherein the body portion is configured to be locked at a plurality of angles in the range of angles.

2. The electronic device according to claim 1, wherein the male charging connector comprises one of a male micro-USB connector, a male USB-mini connector, a male USB-C connector, and a male lightning connector.

3. The electronic device according to claim 1, wherein the battery is configured for charging the second electronic device when the second electronic device is connected to the electronic device via the male charging connector.

4. The electronic device according to claim 3, wherein the male charging connector is connected to the second electronic device when the second electronic device disposed on the stepped portion.

5. The electronic device according to claim 1, wherein the range of angles is from about 0 degrees to about 90 degrees.

6. The electronic device according to claim 1, further comprising a female charging connector electrically connected to the battery.

7. The electronic device according to claim 6, wherein the battery is configured to be charged via a source of electrical power connected through the female charging connector.

8. The electronic device according to claim 6, wherein the female charging connector is disposed in the body portion.

9. The electronic device according to claim 1, wherein the electronic device is portable.

10. The electronic device according to claim 1, wherein the male charging connector is retractable from a protruding position on the landing portion into an opening in the landing portion.

11. The electronic device according to claim 1, wherein the male charging connector is configured to be projected from a retracted position in an opening in the landing portion to a protruding position on the base portion.

12. The electronic device according to claim 1, wherein the second electronic device rests on the landing portion and the riser portion when the second electronic device is disposed on the stepped portion.

13. The electronic device according to claim 1, wherein an upper surface of the male charging connector is at a greater height with respect to the bottom surface of the body portion than a height of the top surface of the body portion with respect to the bottom surface of the body portion.

14. An electronic device, comprising:

a base portion comprising:

a retractable male charging connector configured for connecting to a second electronic device; and a bottom surface, a back surface, a front surface, a top surface, and a stepped portion comprising a landing portion extending from the front surface and a riser portion extending from the top surface;

a body portion connected to the base portion by a hinge portion;

wherein the hinge portion is disposed in part of the back surface and extends from the back surface to a surface of the body portion; and a battery electrically connected to the retractable male charging connector;

wherein the retractable male charging connector is disposed on the landing portion when in a protruding position, and is configured for connecting to the second electronic device when the second electronic device is disposed on the stepped portion;

wherein the body portion rotates in a range of angles with respect to the base portion and with respect to the second electronic device via the hinge portion;

wherein the body portion is rotatable to an angle in the range of angles at which the body portion is oriented over the top surface of the base portion; and wherein the body portion is configured to be locked at a plurality of angles in the range of angles.

15. The electronic device according to claim 14, wherein the retractable male charging connector comprises one of a male micro-USB connector, a male USB-mini connector, a male USB-C connector, and a male lightning connector.

16. The electronic device according to claim 14, wherein the range of angles is from about 0 degrees to about 90 degrees.

17. The electronic device according to claim 14, further comprising a female charging connector electrically connected to the battery.

18. The electronic device according to claim 17, wherein the battery is configured to be charged via a source of electrical power connected through the female charging connector, and wherein the female charging connector is disposed in the body portion.

19. The electronic device according to claim 14, wherein the second electronic device rests on the landing portion and the riser portion when the second electronic device is disposed on the stepped portion.

20. The electronic device according to claim 14, wherein, when in the protruding position, an upper surface of the retractable male charging connector is at a greater height with respect to the bottom surface of the body portion than a height of the top surface of the body portion with respect to the bottom surface of the body portion.

* * * * *